United States Patent
Jardini et al.

(10) Patent No.: US 11,868,222 B2
(45) Date of Patent: *Jan. 9, 2024

(54) SYSTEM AND METHOD FOR INTEGRATION TESTING

(71) Applicant: EMTECH GROUP INC., Toronto (CA)

(72) Inventors: Toni Jardini, Niagara Falls (CA); Spencer Reuben, Holland Landing (CA); Farsam Farzadpour, Scarborough (CA); Akramul Azim, Oshawa (CA); Amalnnath Parameswaran, Brampton (CA); Ansh David, Richmond Hill (CA); Bradley Wood, Pickering (CA)

(73) Assignee: EMTECH GROUP INC., Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/094,784

(22) Filed: Jan. 9, 2023

(65) Prior Publication Data

US 2023/0168985 A1   Jun. 1, 2023

Related U.S. Application Data

(63) Continuation of application No. 17/581,022, filed on Jan. 21, 2022, now Pat. No. 11,620,200.

(60) Provisional application No. 63/173,600, filed on Apr. 12, 2021.

(51) Int. Cl.
G06F 11/00 (2006.01)
G06F 11/263 (2006.01)
G06F 11/34 (2006.01)
G06F 11/273 (2006.01)
G06F 11/22 (2006.01)

(52) U.S. Cl.
CPC ........ *G06F 11/263* (2013.01); *G06F 11/2247* (2013.01); *G06F 11/2733* (2013.01); *G06F 11/3447* (2013.01)

(58) Field of Classification Search
CPC .............. G06F 11/263; G06F 11/2247; G06F 11/2733; G06F 11/3447; G06F 11/0739; G06F 11/261

See application file for complete search history.

(56) References Cited

U.S. PATENT DOCUMENTS

| | | |
|---|---|---|
| 2013/0159774 A1 | 6/2013 | Budnik et al. |
| 2016/0364310 A1 | 12/2016 | Maple et al. |
| 2020/0167256 A1 | 5/2020 | Höfig |
| 2021/0056015 A1* | 2/2021 | Recktenwald ........ G06F 11/079 |
| 2021/0133086 A1* | 5/2021 | Joyce .................. G06F 11/3684 |

(Continued)

*Primary Examiner* — Joseph D Manoskey
(74) *Attorney, Agent, or Firm* — Norton Rose Fulbright Canada LLP

(57) ABSTRACT

There is provided a system and method for performing system integration on an embedded system of a connected and/or autonomous vehicle. Integration testing may include obtaining one or more requirements and/or specifications for a system under test; generating a metamodel based on the requirements and/or specifications; generating test cases based on the metamodel; prioritizing said test cases based on hazards associated with said test cases; executing one or more of said prioritized test cases; and obtaining a verdict for each of said one or more prioritized test cases.

18 Claims, 10 Drawing Sheets

(56) References Cited

U.S. PATENT DOCUMENTS

2021/0263837 A1 8/2021 Hicks et al.
2021/0303450 A1 9/2021 Bhat et al.
2021/0342239 A1 11/2021 Gladisch et al.

* cited by examiner

SYSTEM AND METHOD FOR INTEGRATION TESTING

CROSS-REFERENCE TO RELATED APPLICATIONS

This claims priority to and the benefit of U.S. Provisional Patent Application No. 63/173,600, filed on Apr. 12, 2021, and is a continuation of U.S. patent application Ser. No. 17/581,022, filed Jan. 21, 2022, the entire contents of all of the aforementioned applications being incorporated herein by reference in their entirety.

FIELD

This relates generally to computerized systems for system integration testing of embedded systems, and in particular of embedded systems in connected vehicles and/or autonomous vehicles (CV/AVs).

BACKGROUND

Connected vehicles (CVs) are vehicles that include different communication devices present within the vehicle and enable in-car connectivity with other devices present in the vehicle and/or enable connection of the vehicle to external devices, networks, applications, and/or services. Autonomous vehicles (AVs) are vehicles that are capable of sensing their surrounding environment and moving safely with little to no human input. AVs make use of a variety of sensors and other components (e.g. radar, sonar, GPS, odometers, accelerometers, optical devices, and the like) to perceive their surroundings. As such, CV/AVs often include a complex combination of various systems and components from a variety of different manufacturers. It is important to ensure that components from different manufacturers using different internal protocols are compatible with other components in an embedded system, as a failure of any component may result in catastrophic consequences.

System integration testing (SIT) relates to the testing of a complete system (or subsystem) having many subsystem components or elements included therein. SIT is performed to ensure that the subsystems and components in the system-under-test (SUT) are compatible and will function as expected under various scenarios and use cases.

CV/AVs include a complex combination of systems and components, which makes SIT exceedingly difficult and time-consuming, and at times unfeasible and/or impossible given the number of permutations of components and scenarios for which interoperability and compatibility must be tested. However, ensuring that CV/AVs function as expected (and without anomalous behavior) is essential to the safe operation of such vehicles.

Accordingly, there is a need for a robust solution to SIT for CV/AVs which is less time-consuming and makes more efficient use of time and computing resources than existing SIT methodologies.

SUMMARY

According to an aspect, there is provided a method of performing system integration on an embedded system of a connected and/or autonomous vehicle, the method comprising: obtaining one or more requirements and/or specifications for a system under test; generating, by a processor, a metamodel based on the requirements and/or specifications; generating, by the processor, test cases based on the metamodel; prioritizing, by the processor, said test cases based on hazards associated with said test cases; executing one or more of said prioritized test cases; and obtaining a verdict for each of said one or more prioritized test cases.

According to another aspect, there is provided a system for performing system integration on an embedded system of a connected and/or autonomous vehicle, the system comprising: a computer-readable storage medium having stored thereon computer-executable instructions that, when executed by one or more processors, cause the one or more processors to: obtain one or more requirements and/or specifications for a system under test; generate a metamodel based on the requirements and/or specifications; generate test cases based on the metamodel; prioritize said test cases based on hazards associated with said test cases; execute one or more of said prioritized test cases; and obtain a verdict for each of said one or more prioritized test cases.

Other features will become apparent from the drawings in conjunction with the following description.

BRIEF DESCRIPTION OF DRAWINGS

In the figures which illustrate example embodiments.

DETAILED DESCRIPTION

Figure 1:
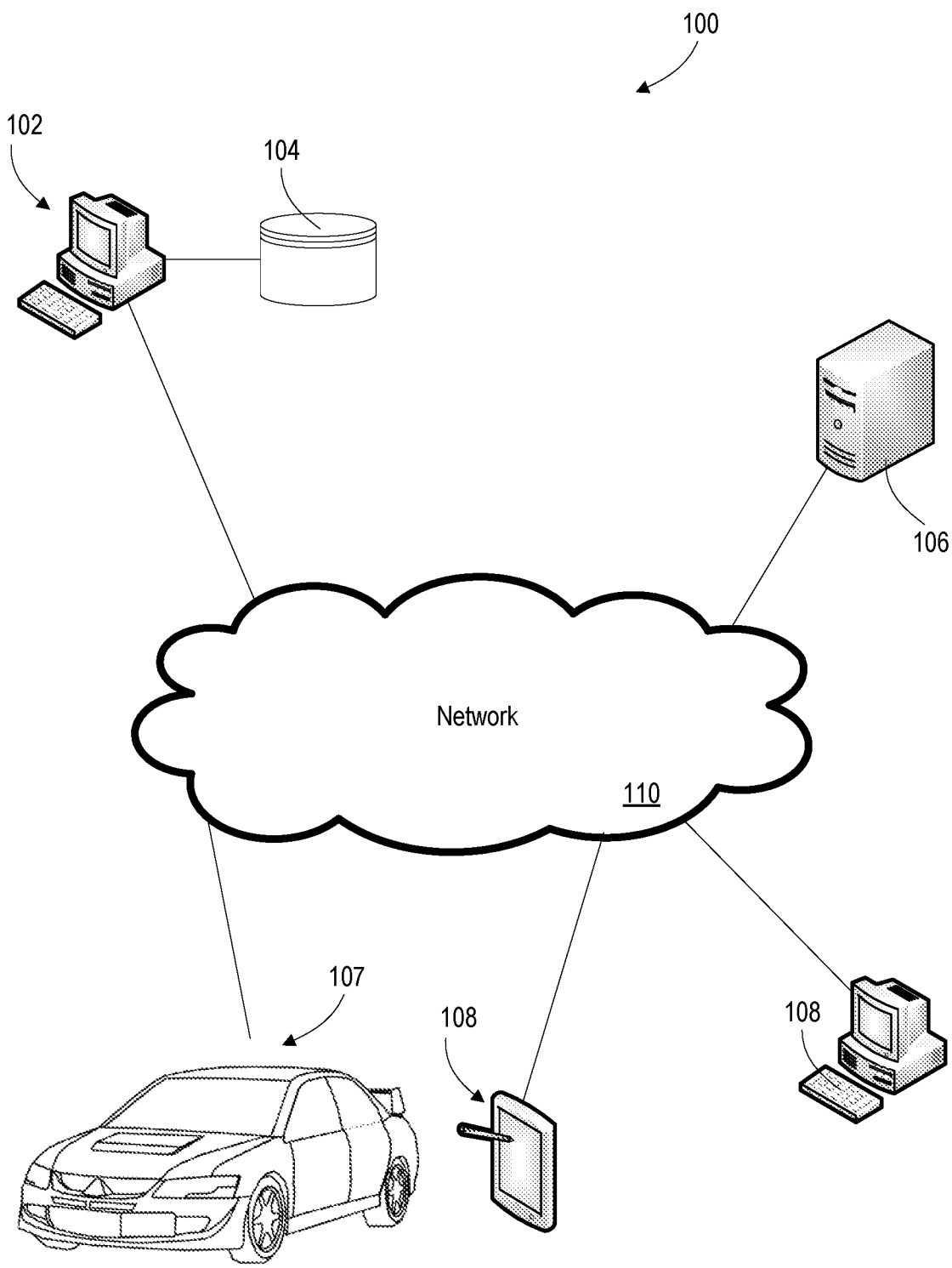
FIG. 1 is a block diagram depicting components of an example computing system.

Technological advancements in the automotive domain have led to the introduction of new automotive systems to the design and development process for vehicles. Such new automotive systems have inherently introduced variation in the operating systems used, communication protocols used, as well as the manufacturers of various components. For example, different vehicles may use different components (e.g. sensors) for measuring the same quantity or attribute, and different vehicles may be running different firmware and/or operating systems or using different networking protocols. The combinations and permutations of different components and operating systems make SIT very difficult.

In automotive systems, there are variations not only in component features (such as I/O types) but also in components having similar functionality produced by different manufacturers. Therefore, retrieving the state of each component in a system independent of manufacturers or variations in a component's features is a challenging task. For each variation in a component's features, a particular testing approach might need to be developed, which is not practical due to limited time and computing resources.

There is a need to develop a solution that can better account for such variations in a single testing framework, as the current standard SIT methodology and best practices do not provide a comprehensive solution for such variations.

In some embodiments, a Model-Based Testing (MBT) approach may be used, which may allow for use of automation in generating test cases, as well as increase testing coverage and lower testing time compared to traditional SIT testing methodologies. However, it is challenging to apply MBT approaches to SIT because it is difficult to develop a model which covers all possible permutations and functionality for a diverse array of components with limited resources for testing.

Moreover, it will be appreciated that in SIT, not all scenarios are equally important. For example, some scenarios are more likely to result in safety hazards than others and should be prioritized accordingly during testing. However, owing to a large number of permutations of components, it is difficult to identify the most critical test cases for testing.

In some embodiments, one or more metamodels may be generated based on one or more system specifications, functional requirements, and/or user requirements of the system-under-test. Such metamodels may serve as a starting point for generating test cases automatically, and in particular through the use of directed acyclic graphs (DAGs). Generated test cases may then be prioritized based on risk criteria, and then executed in a hardware-in-loop test environment. In some embodiments, the test environment may include one or both of physical and virtual (i.e. simulated) system components.

Some embodiments relate to the testing of hardware and/or software components to evaluate the quality and/or compliance with requirements by comparing the actual results of a test to the expected or desired results of a test. Different modules or components of a system or subsystem may be developed by different individuals and manufacturers, which may use different underlying logic to arrive at the same (or a similar) desired output. Therefore, it is necessary to test all module interfaces (or as many as possible) in a given system or subsystem. SIT is conducted to identify defects between interfaces (thereby preventing such defects from causing additional problems at higher levels, such as at the overall system level). In contrast to component integration testing (CIT), which targets interactions and interfaces among integrated components, SIT is conducted to determine whether integrated components are working correctly or not. As such, SIT is a higher level form of testing that focuses on the combination and interactions of systems (or subsystems).

The desired behavior of systems, and in particular software and/or hardware systems, may be modeled according to requirements. Testing is conducted to verify whether a system meets the required requirements or not. Requirements can be categorized into 3 main categories: user requirements, business requirements, and system requirements. User requirements represent end-user requirements for the system (e.g. an operational situation, as described below). System requirements can be further subdivided into 3 sub-groups: functional requirements, non-functional requirements, and domain requirements. Functional requirements define how the system should behave generally. Non-functional requirements include system properties and constraints (e.g. reliability, security, usability, performance, etc.).

Various embodiments of the present invention may make use of interconnected computer networks and components. FIG. 1 is a block diagram depicting components of an example computing system. Components of the computing system are interconnected to define an integration testing (IT) system 100. As used herein, the term "integration testing system" refers to a combination of hardware devices configured under control of software and interconnections between such devices and software. Such systems may be operated by one or more users or operated autonomously or semi-autonomously once initialized.

As depicted integration testing system 100 includes at least one server 102 with a data storage 104 such as a hard drive, array of hard drives, network-accessible storage, or the like; at least one web server 106, a plurality of client computing devices 108, and at least one connected vehicle/autonomous vehicle 107. Server 102, web server 106, client computing devices 108, and CV/AV 107 are in communication by way of a network 110. More or fewer of each device are possible relative to the example configuration depicted in FIG. 1.

Network 110 may include one or more local-area networks or wide-area networks, such as IPv4, IPv6, X.25, IPX compliant, or similar networks, including one or more wired or wireless access points. The networks may include one or more local-area networks (LANs) or wide-area networks (WANs), such as the internet. In some embodiments, the networks are connected with other communications networks, such as GSM/GPRS/3G/4G/LTE networks.

As shown, server 102 and web server 106 are separate machines, which may be at different physical or geographical locations. However, server 102 and web server 106 may alternatively be implemented in a single physical device.

As will be described in further detail, server 102 may be connected to a data storage 104. In some embodiments, web server 106 hosts a website 400 accessible by client computing devices 108 and/or CV/AV 107. Web server 106 is further operable to exchange data with server 102 such that data associated with client computing devices 108 or CV/AV 107 can be retrieved from server 102 and utilized in connection with SIT.

Server 102 and web server 106 may be based on Microsoft Windows, Linux, or other suitable operating systems. Client computing devices 108 may be, for example, personal computers, smartphones, tablet computers, connected and/or autonomous vehicle 107, or the like, and may be based on any suitable operating system, such as Microsoft Windows, Apple OS X or iOS, Linux, Android, or the like.

Figure 2:
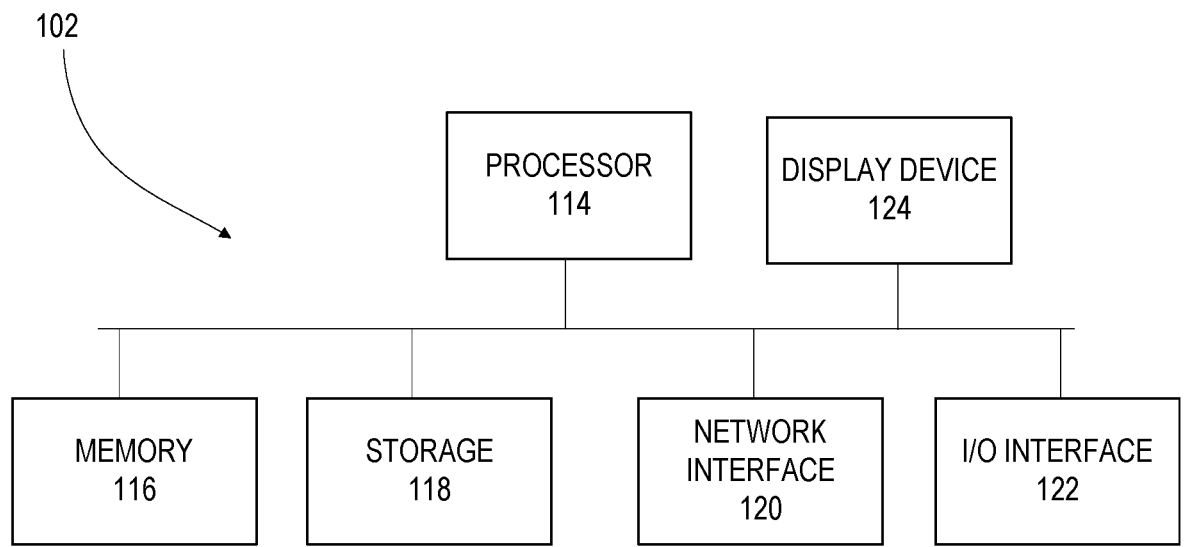
FIG. 2 is a block diagram depicting components of an example server, Connected and/or Autonomous vehicle, or client computing device.

FIG. 2 is a block diagram depicting components of an example server 102, 106, CV/AV 107, or client computing device 108. As depicted, each server 102, 106, client device 108, and CV/AV 107 includes a processor 114, memory 116, persistent storage 118, network interface 120, and input/output interface 122.

Processor 114 may be an Intel or AMD x86 or x64, PowerPC, ARM processor, or the like. Processor 114 may operate under the control of software loaded in memory 116. Network interface 120 connects server 102, 106, CV/AV 107, or client computing device 108 to network 110. Network interface 120 may support domain-specific networking protocols for CV/AV 107. I/O interface 122 connects server 102, 106, or client computing device 108 to one or more storage devices (e.g. storage 104) and peripherals such as keyboards, mice, pointing devices, USB devices, disc drives, display devices 124, and the like.

In some embodiments, I/O interface 122 connects various sensors and other specialized hardware and software used in connection with the operation of CV/AV 107 to processor 114 and/or to other computing devices 102, 106, 108. In some embodiments, I/O interface 122 may be used to connect CV/AV 107 to other computing devices 102, 106, 108 and provide access to various sensors and other specialized hardware and software within CV/AV 107.

In some embodiments, I/O interface 122 may use an OBD2 protocol as the communication interface. In some embodiments, I/O interface 122 may be compatible with protocols such as WiFi, Bluetooth, and other communication protocols. In some embodiments, OBD2 protocol may run on a CAN which may support multiple devices accessible from a CAN network.

In some embodiments, sensors and other specialized hardware and/or software used in connection with CV/AV 107 may include, for example, any one or more of an air bag system, air conditioning system, audio/video devices, bearings, body components, braking system, cameras, car seat, doors, electrical switches, electrified powertrain components, engine components and parts, engine cooling system, engine oil systems, exhaust system, floor components, fuel supply system, gauges and meters, hoses, ignition system, lightning and signalling systems, low voltage electrical supply system, miscellaneous body components, other interior components, other miscellaneous parts, sensors, starting system, suspension and steering systems, tire pressure systems, transmission systems, windows, wiring harnesses, and any combination thereof.

Software may be loaded onto server 102, 106, CV/AV 107, or client computing device 108 from peripheral devices or from network 106. Such software may be executed using processor 114.

Figure 3:
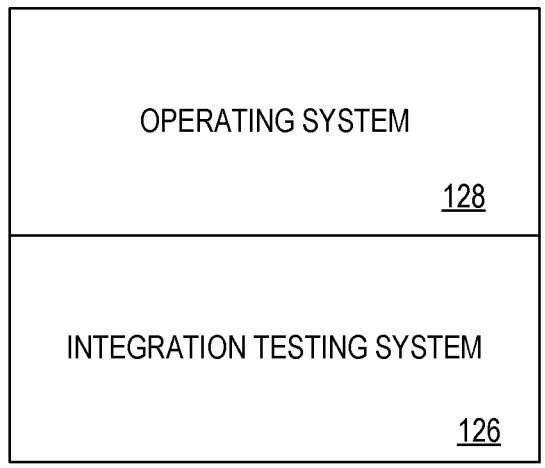
FIG. 3 depicts a simplified arrangement of software at a server or client computing device.

FIG. 3 depicts a simplified arrangement of software at a server 102 or client computing device 108. The software may include an operating system 128 and application software, such as integration testing system 126. Integration testing system 126 is configured to interface with, for example, one or more systems or subsystems of connected vehicle and/or autonomous vehicle 107, and to send control signals (e.g. test cases and accompanying parameters for components) to CV/AV 107. In some embodiments, integration testing system 126 is further configured to accept data and signals from the CV/AV 107 (e.g. test case results) which may be used for SIT (e.g. by comparing actual test results to expected results to determine whether a failure has occurred).

Figure 10:
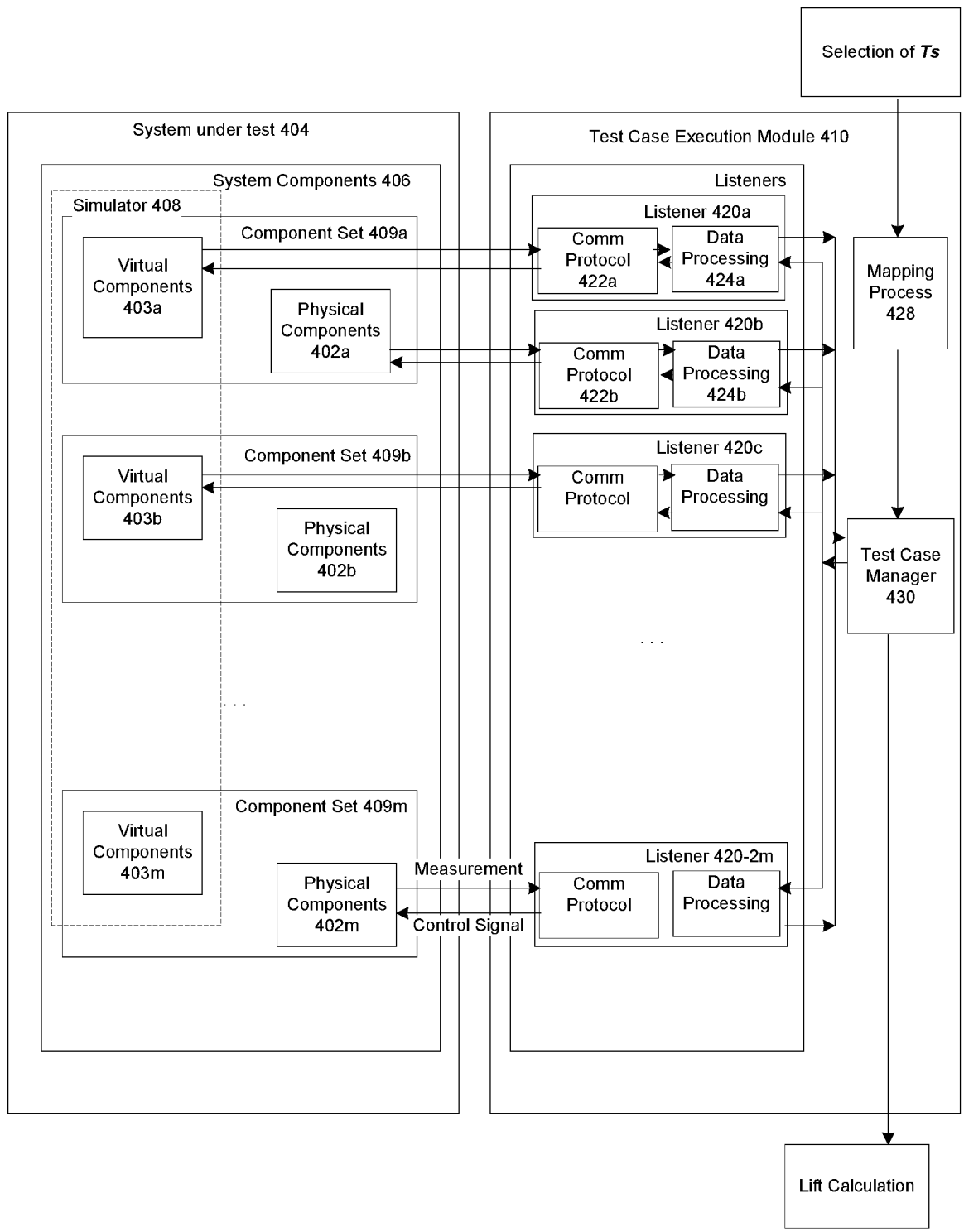
FIG. 10 is a block diagram depicting components of an example integration testing system when connected to a connected and/or autonomous vehicle.

FIG. 10 is a block diagram depicting components of an example integration testing system 126 when connected to a CV/AV 107. As depicted, the SUT 404 (e.g. components of CV/AV 107B) forms numerous connections with test case execution module 410. In particular, connections between listeners 420 in test execution module 410 are formed with physical 402 and/or virtual components 403 of the CV/AV 107. Communication between components 406 and listeners 420 may be, for example, half-duplex, full-duplex, or any other suitable configuration for sending and receiving signals to and from components 406 and listeners 420. As depicted, test case manager 430 receives output signals from various components via listeners 420, and the test case manager also sends test case parameters to various components 406 via listeners 420.

Throughout this disclosure, reference is made to various aspects of integration testing systems using terminology as follows.

In some embodiments, rules are defined based on conditions and/or data derived from requirements. Rules may be described by a set of conditional statements covering one or multiple conditions. Rules may be implemented using any number of suitable data structures and algorithms capable of expressing the underlying conditional statements and relationships.

In some embodiments, a metamodel refers to a modeling technique used for software and/or hardware testing. In some embodiments, a metamodel may be implemented in the form of a DAG.

In some embodiments, a use case describes how to use a process or system to perform a particular task. In some embodiments, a use case may include one or more of an actor (e.g. a user), a system, and a goal.

In some embodiments, a test case is an instance of a use case that includes a set of pre-conditions for one or more system components' states within the SUT, a certain action (e.g. an input, also referred to as an "activator set") to initiate or initialize the test case, and expected results (e.g. post-condition) to cover a test scenario. Test cases may be used to determine whether the SUT properly satisfies a given requirement or set of requirements.

In some embodiments, a test scenario (also referred to as a test condition) may be a high-level document defining the scenario of performing a given test case or test cases. A test scenario may be obtained by obtaining information from one or more sources such as clients, stakeholders, and developers. While a test scenario may describe the functionality of the system as a whole to be tested, a test scenario may also be a test procedure and may cover one or multiple test cases. As such, a test scenario may be seen as focusing on 'what to test' rather than 'how to test' about a test case.

In some embodiments, an operational situation (or OpSit) may be described by a test scenario and the corresponding testing environment in which the SUT is supposed to perform safely. In some embodiments, an OpSit may include a system's state (e.g. operational mode) and/or environment conditions (e.g. weather conditions). An example OpSit is described below.

Some embodiments of the invention make use of a MBT methodology. MBT may provide a strong testing approach that can enhance traditional testing strategies by allowing for the automatic generation of test cases. However, such automatic generation of test cases may require obtaining or generating a behavioral description of the SUT, referred to herein as a system model, which may apply to both hardware and software testing.

Figure 4:
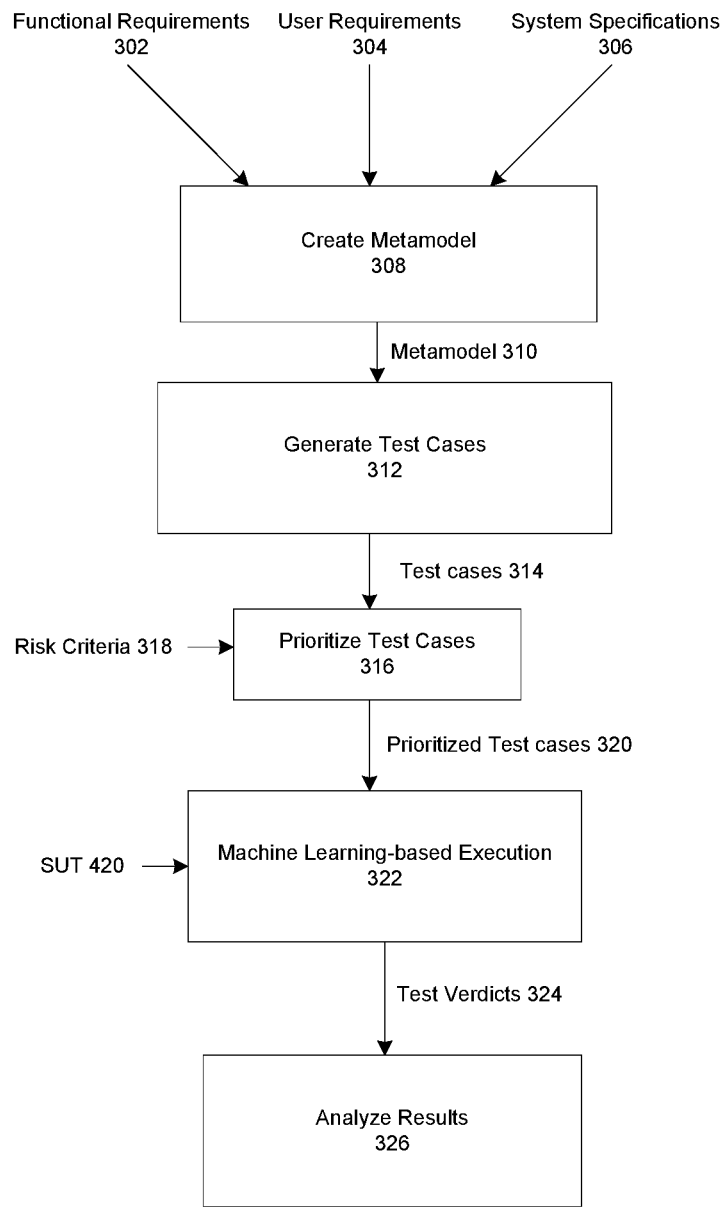
FIG. 4 depicts an example framework or process of performing SIT.

Various aspects of a methodology used for developing a model-based SIT framework for CV/AVs 107 are described herein. In some embodiments, a testing framework or process 300 may include one or more of four main steps: generating a metamodel 308, generating of test cases 312, prioritization of test cases 316, and execution of test cases 322. FIG. 4 depicts an example framework or process 300 of performing SIT.

Figures 5A, 5B:
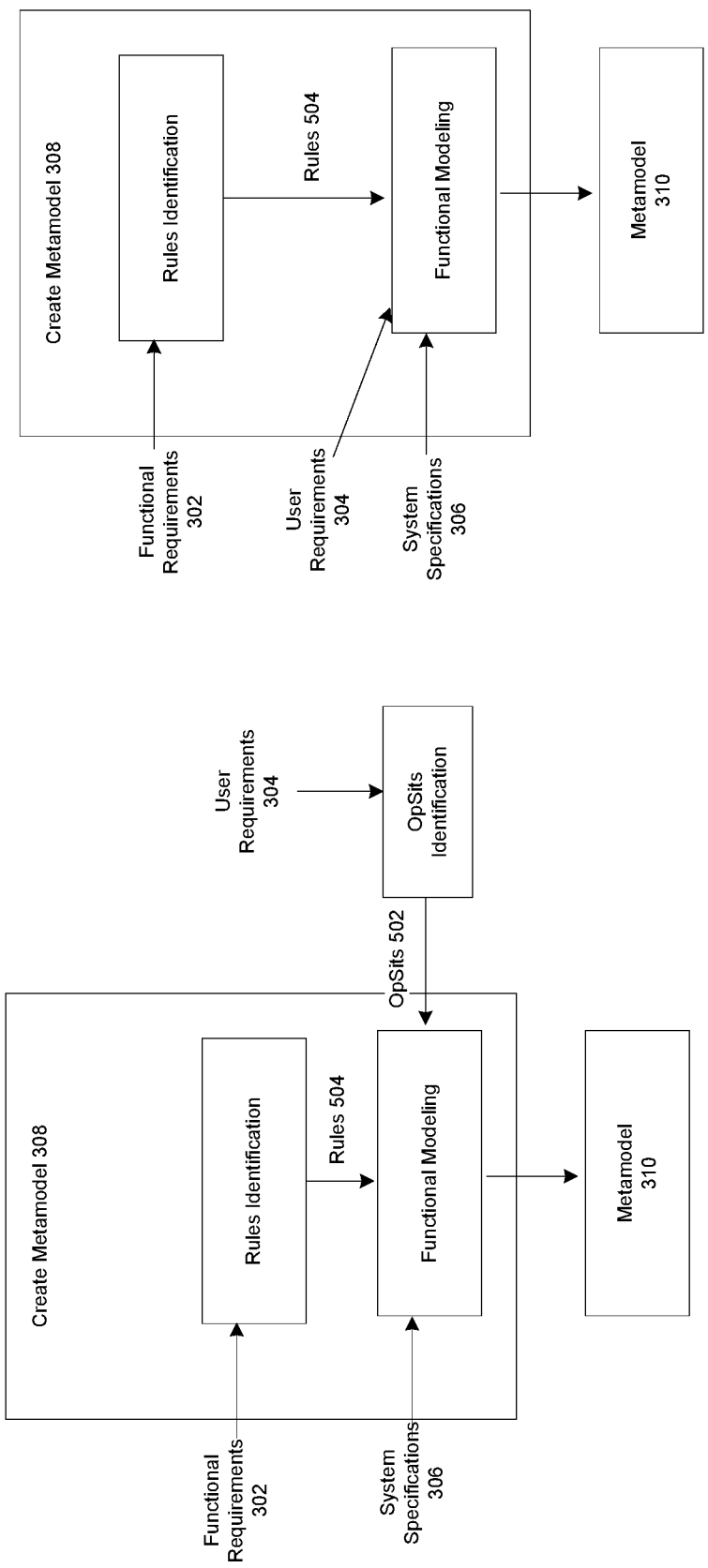
FIG. 5A is a block diagram depicting an expanded process for creating metamodel.
FIG. 5B is a block diagram depicting an expanded alternative process for creating metamodel 308.

As contrasted with traditional models created through MBT, at block 308, metamodel 310 may be generated from one or more of functional requirements 302, user requirements 304 (which may include OpSits), and/or system specifications 306. FIG. 5A is a block diagram depicting an expanded process for creating metamodel 308. As depicted, in some embodiments, OpSits 502 may be identified based on user requirements 304. Functional requirements 302 may be used to generate Rules 504. System specifications 306, Rules 504 and OpSits 502 may then be used to generate a metamodel 310 using functional modeling.

FIG. 5B is a block diagram depicting an expanded alternative process for creating metamodel 308. In this alternative process, functional requirements 302 may be used as inputs for a rules identification process to generate rules 504. A functional modeling block may then accept as input the rules 504, user requirements 304, and system specifications 306 to generate metamodel 310.

Given a list of user requirements 304 (encoded, for example, as a computer-readable list of requirements encoded on a computer-readable storage medium), processor 114 may be configured to generate a list of all OpSits in which the SUT might result in a harmful outcome. Such a list may be based on some or all possible situations in which a user or other entity may be operating the SUT 404.

A set of all possible OpSits may be defined as $O=\{O_1, O_2, O_3, \ldots, O_b\}$, where $b \in \mathbb{Z}^+$ is the number of operational situations and $O_i$ (for $i \leq b$) is the i-th operational situation. An example OpSit may be conceptualized as follows:

In some embodiments, an example OpSit 502 for a connected and/or autonomous vehicle 107 may be represented by three groups of items, namely:
Vehicle={driving speed, direction}
Road={slope, obstacle, traffic}
Environment={weather, temperature, momentum}
In this example, a total of 8 components' states (which provide the various states for each variable) may be required to be specified for an OpSit 502 to be described.

In some embodiments, rules identified from functional requirements 302 may be referred to as functional rules (or "in-short rules"). In some embodiments, each rule ($R_i$) may be framed as a conditional statement that may have multiple possible conditions and outputs for the component or components under consideration.

For example, in a metamodel containing m components with a finite number of n states for each component, a set of all components C may be defined as:

$$C=\{C_1, C_2, \ldots, C_m\}$$

where $C_i=\{S_i^1, S_i^2, \ldots, S_i^{n_i}\}$, m, $n_i \in \mathbb{Z}^+$, $i=[1, \ldots, m]$, $n_i$ is the number of i-th component states. The $S_i^j$ is an expression that specifies the j-th state of the i-th component. Let S be a collection of all states of the metamodel's components having m elements defined as $$S=\{S_i^{n_i} | \forall i \in \{1, \ldots, m\} \text{ and } n_i \in \mathbb{N} + \{0\}\}$$

From this, the metamodel's component space of n dimensions may be written as $$S^n=\{a_1 \times a_2 \times \ldots \times a_n | n \in \mathbb{N}, a_i \in S \text{ and } i \in \mathbb{N}\}.$$

There may be provided a set of logical operators defined as $\mathcal{L} =\{AND, OR, XOR, NOT, \ldots\}$. Thus, the logical operator space of n dimensions may be written as: $\mathcal{L}^n=\{a_1 \times a_2 \times \ldots \times a_n | n \in \mathbb{N}, a_i \in \mathcal{L} \text{ and } i \in \mathbb{N}\}$ A relational operator space of n dimensions may be defined as $\mathcal{L}=\{>, <, \leq, \geq, \ldots\}$. Thus, the relational operator space of n dimensions may be written as $$\mathcal{L}^n=\{a_1 \times a_2 \times \ldots \times a_n | n \in \mathbb{N}, a_i \mathcal{L} \text{ and } i \in \mathbb{N}\}$$

From the above, a set of all rules obtained from the system requirements 302 may be defined as $$R=\{R_1, R_2, \ldots, R_k\}$$

where $k \in \mathbb{Z}^+$ is the number of the rules and $R_i$ (for $1 \leq i \leq k$) is the i-th rule defined as $$R_i=\{P \rightarrow Q | P, Q \in \phi\}$$

where the operator "$\rightarrow$" is used for "implies" and $\phi=\{\mathcal{L}^l \times \mathcal{L}^b \times S^p | l, b, p \in \mathbb{N} + \{0\}\}$.

As noted above, rules 504 may be defined in terms of conditional statements and outputs. An example rule $R_i \in R$ is described in further detail.

In this example, $R_l$ is of the form:
IF {$1^{st}$ component has state 1 and $2^{nd}$ component has state 3 and either {$3^{rd}$ component has state 3 or $4^{th}$ component has state 1} or {$3^{rd}$ component has state 2 and $2^{nd}$ component state is greater than or equal to 1}
THEN {$5^{th}$ component should have state 5 or $6^{th}$ component should have state 8}
In some embodiments, $R_l$ may be expressed as:
$R_l$: If {{$S_1^1$ and $S_2^3$ and either {$S_3^3$ or $S_4^1$}} or {$S_3^2$ and $S_2^3$ is greater than or equal to 1} then there will be $S_5^5$ or $S_6^8$
$R_l$ may also be rewritten using logical and relational operators as:

$$R_l: \text{If } ((S_1^1 \cap S_2^3 \cap (S_3^3 \oplus S_4^1)) \| (S_3^2 \cap S_2^3 \geq 1)) \rightarrow S_5^5 \| S_6^8$$

where the operator "$\cap(\bullet)$" is used for "and", the operator $\|$ is used for "or" and the operator "$\oplus$" is used for "either". This means that in this example, we have three logical operators, $\mathcal{L}=\{AND, OR, XOR\}$, one relational operator, $\mathcal{L}=\{\geq\}$, and six components are involved, $S=\{S_1^1, S_3^2, S_2^3, S_4^1, S_5^5, S_6^8\}$. In other words, the $R_l$ has the following structure, $$R_l=\{\mathcal{L}^3 \times \mathcal{L}^1 \times S^5 \rightarrow \mathcal{L}^1 \times S^2\}$$

In some embodiments, a metamodel is represented by a DAG having vertices representing components and edges representing the relationships between components. Identified rules may be later assigned to corresponding edges in a DAG. Thus, a metamodel may be represented by a DAG as $G=(C, \varepsilon)$
where the total number of nodes (components) m=|C|, $\varepsilon$ describes a set of edges in the graph showing possible interaction among the components (C).

As used herein, metamodel components (or simply components) may include system components and OpSits components. A system component may be part of the SUT 404 that is separable and behaves like a black box to execute a task at the application level. A component may be composed of hardware parts and/or software units and relates to the component's states and their corresponding attributes, while OpSits components are external and act on the SUT.

As used herein, a state may refer to the characteristics of a metamodel's component, which may change over time. For example, a camera state could be ON/OFF.

As used herein, an attribute may be used to glean or extract information regarding the interaction of a component in the metamodel. For example, lift values (as described below) may refer to the likelihood of a component resulting in a failure in the metamodel.

As used herein, an activator set may refer to a set of one or more components that have the potential to affect another component in a specific state or states. An activator set may be conceptualized as a test case action stated at the component level.

As used herein, an aggregator may refer to an integrator unit used for situations where an activator set has at least two components. In certain figures described herein, an aggregator may be represented by a rectangle/diamond shape.

As used herein, an impacted set may refer to a set of one or more components that are affected by an activator set (and therefore which might result in a change of the state of one or more components in the impacted set).

As used herein, an activator edge refers to the edge which traverses in a single direction from an activator set to the impacted component under certain conditions (e.g. rules) obtained from functional requirements. Therefore, in some embodiments, every activator edge is associated with a single rule.

Figure 6:
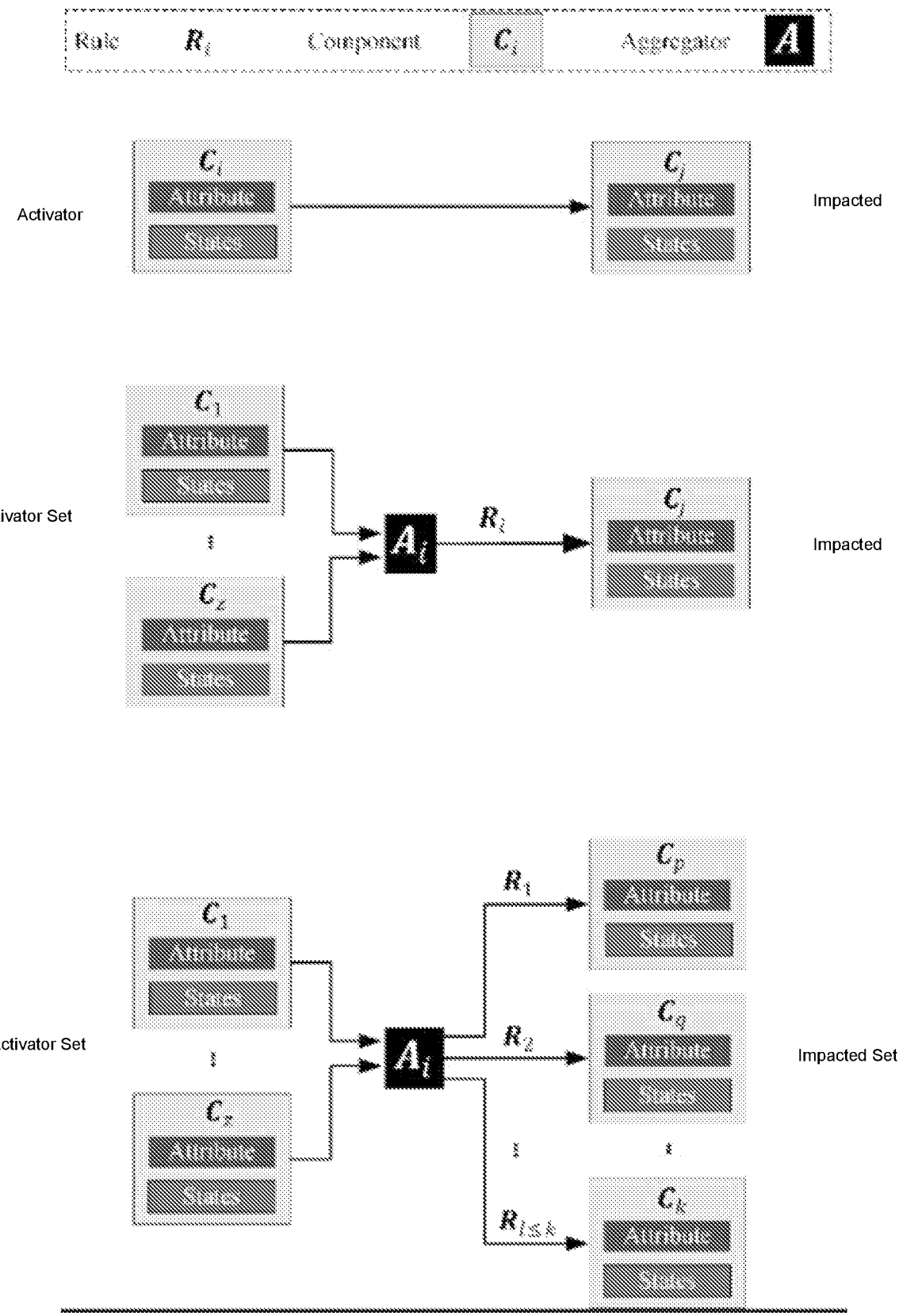
FIG. 6 is a depiction of different types of relationships which may exist between activator sets and impacted sets.

In some embodiments, there may be three different types of relationship between activator sets and impacted sets, as illustrated in FIG. 6. In a Type I relationship, one activator impacts one component state. In a Type II relationship, an activator set (e.g. more than one component) impacts one component state. In a Type III relationship, an activator set impacts the state of 2 or more components in the impacted set.

For each activator set, there are corresponding rules ($R_1$, $R_2$, ..., $R_{l \le k}$) which each targets a single component through an activator edge. For example, using the above definitions, a proposed metamodel may be represented with functional rules. Such a model may serve as the basis for the generation of test cases utilizing a graph-based approach.

Figure 7:
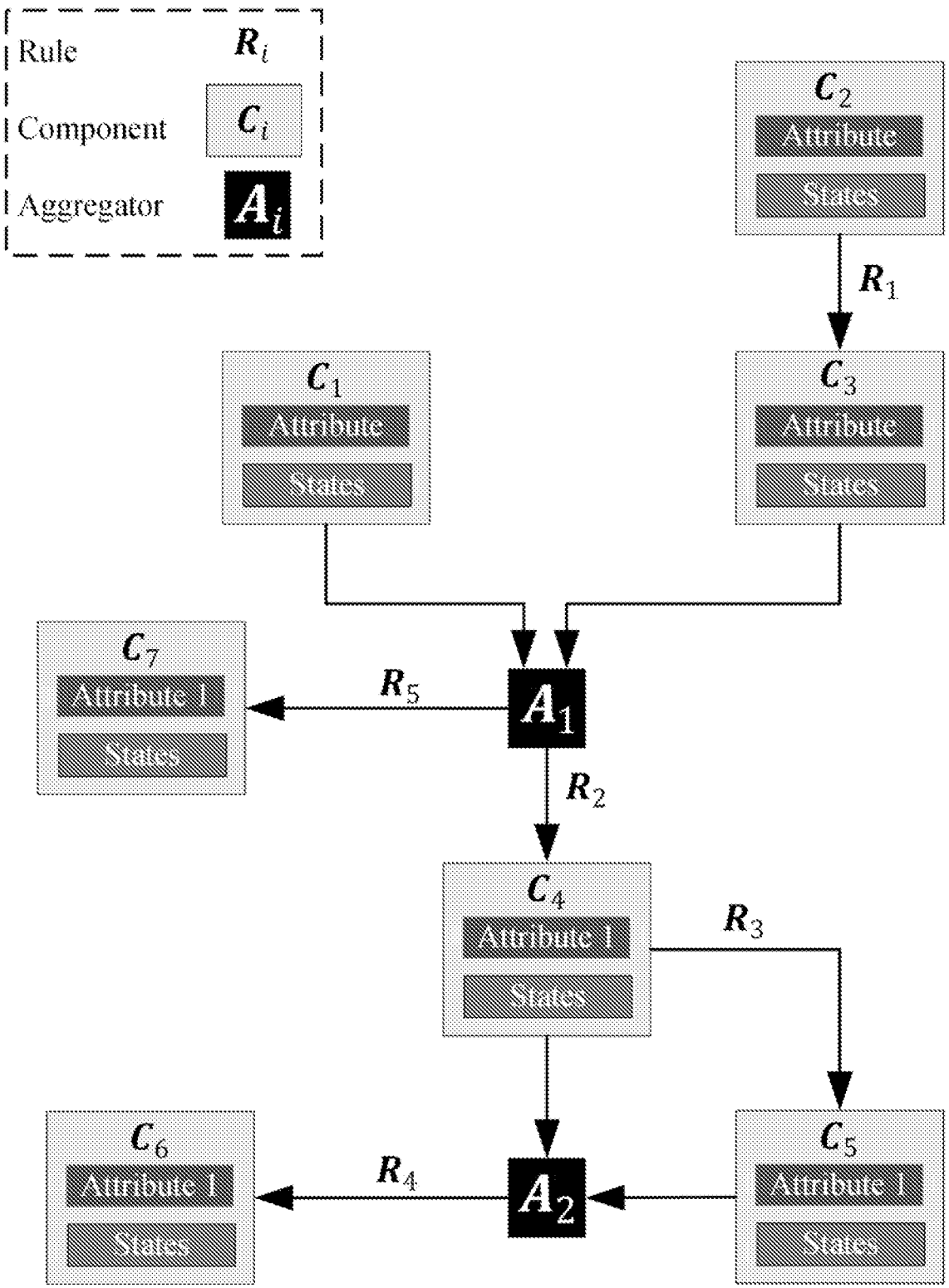
FIG. 7 is an illustration of an example metamodel.

FIG. 7 is an illustration of an example metamodel. As depicted, metamodel 700 includes 7 components (m=7), and a set of functional requirements which has been translated into 5 rules (k=5). In this example, the first activator set has one component ($C_2$) and the impacted set has one component ($C_3$). The second activator set includes $C_1$, $C_2$ and $C_3$, and the corresponding impacted set has two components, $C_7$ and $C_4$ connected through two activator edges. The third activator set includes $C_1$, $C_2$, $C_3$ and $C_4$ and an impacted set including only $C_5$. The fourth activator set includes $C_1$, $C_2$, $C_3$, $C_4$ and $C_5$, and an impacted set including only $C_6$. As depicted, to evaluate the state of the component $C_5$, three rules (i.e. $R_1$, $R_2$ and $R_3$) must be applied and four component's states ($C_1$, $C_2$, $C_3$ and, $C_4$) will require evaluation.

In some embodiments, test cases may be generated automatically by a computing system based on a metamodel in which OpSits were derived from user requirements, and a system model is constructed from functional requirements.

Generation of test cases 312 may be performed in several ways. In some embodiments, a list of all possible combinations of every component's state is generated as the candidate test cases. Then, the rules are associated with the system model are processed by processor 114 and a subset of test cases may be selected using a recursive algorithm. In some embodiments, the recursive algorithm may be a depth-first search (DFS). In some embodiments, unfeasible and/or invalid combinations of component states may be removed as a result of the processing, thereby reducing the number of possible combinations of component states.

In the case of a SUT with m components with $n_i \le m$ states (for i=[1, ..., m]), the total number of combinations (without repetition) of m components may be expressed as:

$$w = \prod_{i=1}^{m} n_i$$

If $P \in \phi$ is a set of pre-conditions on the state of the SUT's components, then a set of actions $I \in \phi$ defined by the change in the state of the SUT's components may be defined as $I = \{X \in \phi | \forall S_j \in X, S_j \notin P, C_i \in P, i \in \{1, ..., m\}$ and $j \in \{1, ..., n_i\}\}$ In other words, for every component ($C_i$) in I, there will be the same component ($C_i$) with a different state in P. If $Q \in \phi$ is the set of post-conditions (e.g. expected results) on the state of the system's components, then the set of all possible combinations (e.g. selections) of the state of the SUT's components may be defined as V=P∪I.

Thus, the set of all candidate test cases, having w elements, may be defined as $T_o = \{V \to Q | V, Q \in \phi\}$ The set $T_o$ may be defined as the combination of all component states having different logical ($\mathcal{L}$) and relational ($\mathcal{L}$) operators.

From the set of all candidate test cases $T_o$, a set of legitimate test cases ($T_c$) 314 may be obtained by checking test cases within $T_o$ against the rules (R), and discarding and/or ignoring test cases that do not satisfy any defined rules. Thus, the set of feasible test cases will be a subset of $T_o$, represented as $T_c = \{W \in T_o | R \subseteq W\}$, where W is a superset of the system's rules.

Although reducing the number of test cases to only legitimate test cases reduces the computational burden for SIT, it is nevertheless impractical or impossible to test all cases in $T_c$ in a reasonable time. Moreover, not all test cases in $T_c$ are necessarily essential or as important as another. For example, a test case that confirms that the brakes of a vehicle will be activated if a camera fails during self-driving mode may be considered more important than a test case confirming that a LED light in the trunk of a vehicle will illuminate temporarily when the vehicle is unlocked.

Figure 8:
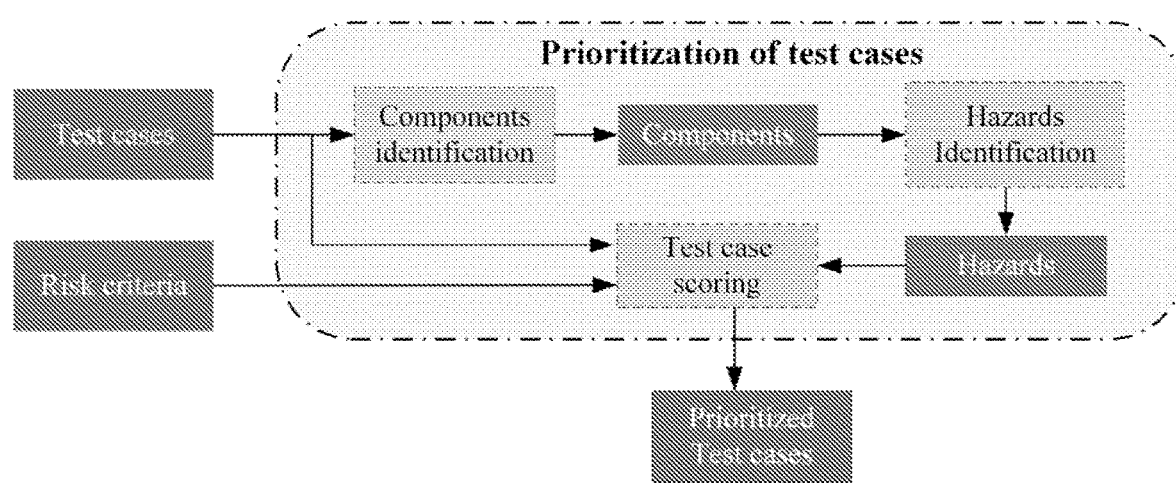
FIG. 8 is an expanded diagram of a process for performing prioritization of test cases.

As such, it would be desirable to optimize or otherwise prioritize test cases from $T_c$ to execute, before beginning execution of test cases. FIG. 8 is an expanded diagram of a process for performing prioritization of test cases 318. In some embodiments, test case prioritization 318 is performed to ensure that the most important test cases are executed first. In some embodiments, test cases may be prioritized based on risk criteria (for example, by analyzing safety hazards associated with a component's failure at the system level). In some embodiments, a process for prioritizing test cases 318 may include two inputs: test cases and risk criteria.

In some embodiments, test case prioritization 318 may include three processing blocks: components identification 802, hazards identification 804, and test case scoring 806.

In some embodiments, all metamodels' components and their corresponding states being used in all generated test cases are identified for risk analysis. A set of all components included in all generated test cases may be defined as:

$C_{tc} = \{C_1, C_2, ..., C_w\}$ where $w \le m \in \mathbb{N}$ and $C_i = \{S_i^1, S_i^2, ..., S_i^{n_i}\}$, $n_i \in \mathbb{N}$ is the number of i-th component's states for $1 \le i \le w$.

In some embodiments, any metamodel's components can fail and consequently generate a hazard condition (e.g. a safety hazard) at the system level. Hazard identification 804 may be performed by, for example, brainstorming, creating checklists, reviewing quality control history of components, field studies, and other approaches such as failure mode and effects analysis (FMEA), Hazard and Operability Studies (HAZOP), or the like.

According to some embodiments, one may define $S \in C_i$ as the component's state where $C_i \in C_{tc}$ and let $f: O_i \times S \to H$.

The potential hazard (H) associated with each component's state (S) failure at the system level may be defined as $H = f(S)$. Therefore, for all components in test cases ($C_{tc}$), we may define $H = \{H_1, H_2, H_3, ..., H_w\}$ where $w \leq m \in \mathbb{N}$ and $H_i$ (for $i \leq w$) are the hazards associated with the i-th component defined as $$H_i = \{H_i^1, H_i^2, \ldots, H_i^{n_i}\}$$

where $n_i$ is the number of i-th component's states and $H_i^j$ (for $j \leq n_i$) is an expression that specifies the hazard associated with the j-th state of the i-th component.

When hazards have been identified, a test case scoring 806 may be conducted. Scoring test cases may be performed by conducting a risk analysis of a potential safety hazard by considering risk criteria. Such an approach may be based on the potential failure mode of every state of each component. Thus, given that test cases, risk criteria, and hazards are available as inputs, a risk score may be determined for each test case, and test cases may be prioritized based on the resulting risk scores.

An example process for calculating a risk score may be as follows:

Given risk criteria ($\kappa$), the risk score ($\varphi$) corresponds to the potential hazard (H) associated with a component state, $S \in \mathcal{S}$, is defined as $$\varphi(S) = f(\kappa, H)$$

where $\varphi$ is a single value. An example of $\kappa$ could be severity, occurrence, detection, etc. Let set $E_l \subseteq \mathcal{S}$ be a collection of each component state that exists in pre-conditions and inputs of the l-th test case. Then, a set of risk scores correspond to the potential hazard associated with each element of $E_l$, is defined as $$B_l = \{\varphi(S) | \forall S \in E_l\}$$

Thus, the resultant risk score of the l-th test case is obtained by $$\varphi_l^R = g(B_l)$$

where $g(\bullet)$ is a function mapping the risk scores set ($B_l$) to a single value. By calculating the resultant risk score for all test cases, a sorted list of test cases ($T_o$) will be obtained.

A worked example of calculating a risk score for a test case may be as follows:

Let's consider a test case as follow, $$T_e: S_1^1 \cap S_2^3 \cap S_3^2 \rightarrow S_5^5 \| S_1^8$$

where the operator "$\cap(\bullet)$" is used for "and", the operator $\|$ is used for "or" and $S_i^j$ is an expression that specifies the j-th state of the i-th component. In this test case, it is assumed that $S_1^1$ is the action, $S_2^3$ and $S_3^2$ are pre-conditions and $S_5^5$ and $S_1^8$ are post-conditions on the system states.

Let's assume that the hazards associated with $S_5^5$ and $S_1^8$ are $H_5^5$ and $H_1^8$, respectively, and obtained by $$H_5^5 = f(S_5^5)$$

and $$H_1^8 = f(S_1^8)$$

By defining the risk criteria as "Severity" and "Occurrence" of the hazards associated with the component's state, for $S_5^5$, we have Severity $(H_5^5) = \alpha_1$, Occurrence $(H_5^5) = \alpha_2$ and for $S_1^8$, we have Severity $(H_1^8) = \beta_1$, Occurrence $(H_1^8) = \beta_2$ In some embodiments, $\alpha$ and $\beta$ are known values. In some embodiments, "severity" may be assessed as the outcome of harm to the user (or environment) and considered to be a single factor value corresponding to a qualitative level (such as low, medium, or high). In some embodiments, "occurrence" may be the probability of occurrence of the aforementioned harm.

Let's define the function $f$ as a function that maps $\kappa$ to a single value ($\varphi$) through multiplying risk criteria. Thus, we have $$f(\kappa, H_5^5) = \text{Severity}(H_5^5) \times \text{Occurrence}(H_5^5)$$

In other words, the risk score is obtained by $$\varphi(S_5^5) = \alpha_1 \times \alpha_2$$

Proceeding in a similar manner for $S_1^8$, we have $$\varphi(S_1^8) = \beta_1 \times \beta_2$$

Hence, we have $$B = \{\varphi(S_5^5), \varphi(S_1^8)\}$$

In some embodiments, a function g is defined such that it maps B to the resultant risk score through multiplying risk scores. Therefore, in some embodiments, the resultant risk score associated with a test case may be determined by $$\varphi^R = g(B) = \alpha_1 \times \alpha_2 \times \beta_1 \times \beta_2.$$

Figure 9:
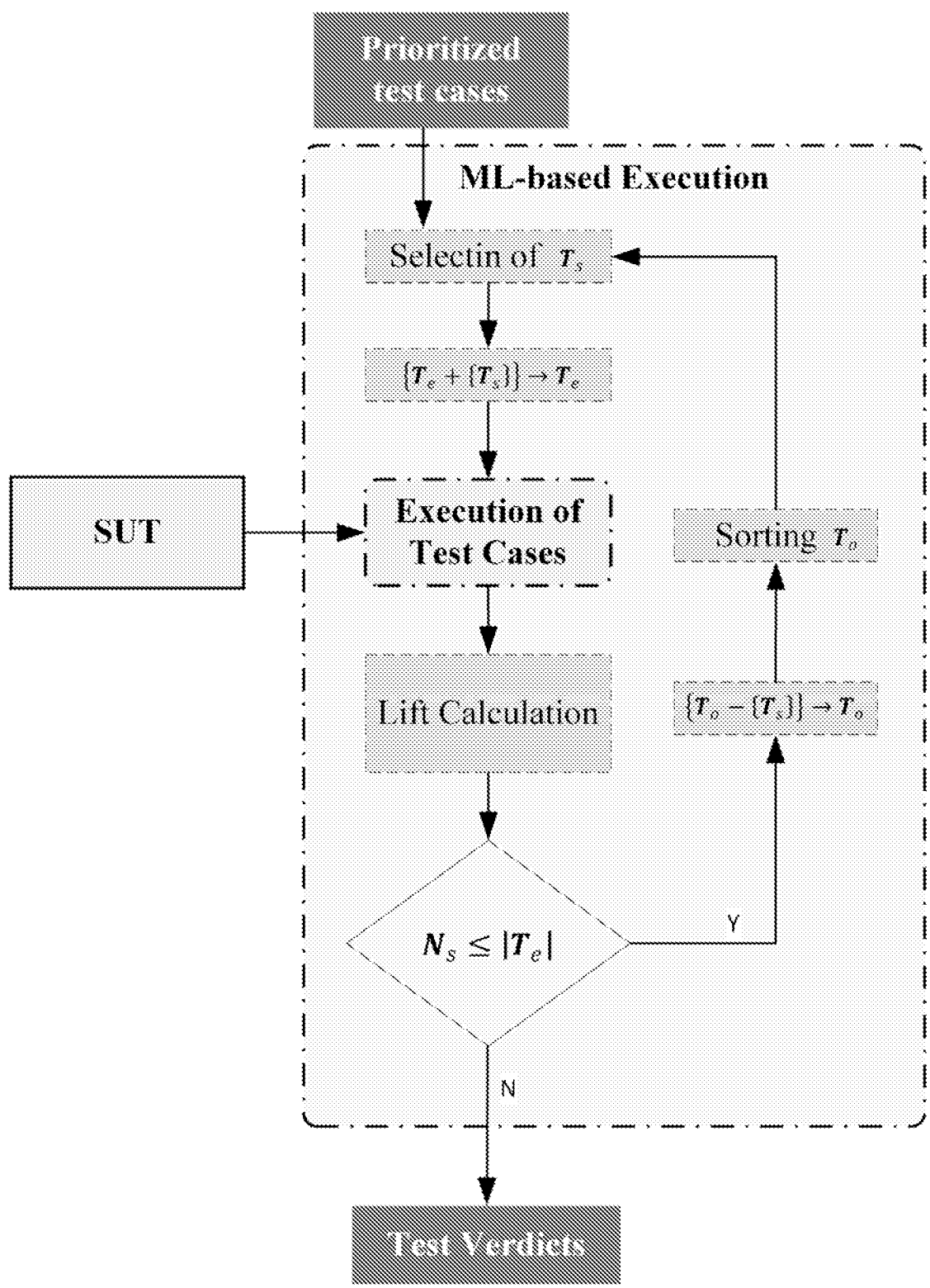
FIG. 9 is a flow chart depicting an example process for performing machine learning-based execution.

In some embodiments, test cases 314 may be prioritized by obtained risk scores to obtain prioritized test cases 320. Prioritized test cases may then be sent for execution, (for example, machine learning-based execution 322). FIG. 9 is a flow chart depicting an example process for performing machine learning-based execution 322.

As depicted, a rule-based machine learning technique (RBML) may be implemented by integration testing system 126 via processor 114 which assigns a risk score $\varphi$ to each component's state $S \in \mathcal{S}$. In some embodiments, the risk score may be assigned by executing a sample set of test cases ($T_s$). In some embodiments, a metric referred to herein as lift may be defined for scoring various components' states. The lift indicates the strength of an association rule over the execution of a sample set of test cases.

For example, $N_s$ may be defined to denote the maximum number of test cases that can be executed due to the availability of time and computing resources for execution. A set of sampled test cases $T_s \subseteq T_o$ may be selected for execution. In some embodiments, the size of a sample set of test cases may be a proportion of the maximum number of test cases, e.g. $|T_s| = 0.1 \times N_s$. It will be appreciated that any proportion other than 10% may also be chosen to suit a particular situation.

Sampling set $T_s$ may be obtained by selecting $|T_s|$ test cases from among the test cases with the highest risk scores for execution. After execution of the sampling set $T_s$, the remaining test cases in $T_o$ may be re-prioritized based on the new scores assigned to the components' states. Thereafter, the process of selecting a new sampling set $T_s$ may continue until the number of executed test cases reaches $N_s$ (the maximum number of test cases that can be executed within the time and resource constraints).

In some embodiments, integration testing system 126 may perform a calculation of a lift metric, as follows. As test cases are executed, some test cases may fail during execution.

Let $T_f \subseteq T_s$ denote a set of test cases that failed during the execution of test cases.

As such, $T_s = T_p \cup T_f$, where $T_p$ is the set of passed test cases. We may define $T_i^j \subseteq T_s$ as a set of test cases which includes component $C_i$ with the state of $S_i^j$ in either their pre-condition (P) or input (I) or, an association rule ($A_i^j$) is defined as $$A_i^j: E_i^j \Rightarrow \text{Fail}$$

where the antecedent $E_i^j \in T_i^j$ is a test case, and the consequent Fail means the failure of the test case. Let $F_i^j \subseteq T_i^j$ denote a set of all failed test cases. Let define Confidence ($A_i^j$), as a function indicating how frequent $A_i^j$ is taking place.

$$\text{Confidence}(A_i^j) = \frac{|F_i^j|}{|T_i^j|}$$

where the operator |•| denote cardinality (size) of a set. Let define Support ($A_i^j$) as a function indicating how frequently $A_i^j$ appears in the $T_s$, $$\text{Support}(A_i^j) = \frac{|T_i^j|}{|T_s|}$$

Then, the strength of association rule (Lift), is defined as $$\text{Lift}(A_i^j) = \frac{\text{Confidence}(A_i^j)}{\text{Support}(A_i^j)}$$

where Lift($A_i^j$)≥0. For Lift($A_i^j$)=1, the possibility of test case failure is independent of the target $S_i^j$. In other words, there is no association between $S_i^j$ and test case failure. For Lift($A_i^j$)<1, the target $S_i^j$ is unlikely to result in test case failure.

By considering Lift($A_i^j$) as the risk score assigned to S∈S, the updated φ(S) is obtained by $$\varphi(S) = f(\kappa, H) \times \text{Lift}(A_i^j)$$

where $f(\kappa, H)$ is the risk score obtained from the prioritization of test cases. Having φ(S) updated, a new resultant risk score ($\varphi_f^R$) will be determined which result in having a new sorted list of remaining test cases $T_o$.

In some embodiments, prioritized test cases are executed and the actual results of the test are compared with the expected results. Prioritized test cases (within a sampling set) may be executed while keeping the execution order intact.

FIG. 10 is a block diagram depicting components of an example integration testing system 126 configured to execute one or more test cases. As depicted, integration testing system 126 includes a test case execution module 410 connected to a connected or autonomous vehicle 107 (depicted as SUT 404). In some embodiments, CV/AV 107 includes one or more physical components 402 (e.g. sensors, interfaces, or the like). As depicted, when CV/AV 107 is connected to integration testing system 126, physical components 402 may be subdivided into subsets 402, 402b, ... 402m, or in any suitable combination. In other embodiments, physical components 402 may be in a single set.

As depicted, test case execution module 410 is connected to SUT 404. SUT 404 includes system components 406, simulator 408, and physical components 402 from the CV/AV 107.

It should be noted that systems and methods described herein may also and/or alternatively be implanted using different test mechanisms, such as Model in the Loop (MIL), Software in the Loop (SIL), Processor in the Loop (PIL), and Hardware in the Loop (HIL). HIL testing enables the testing of embedded systems and their integration as implemented in the SUT. However, owing to the large number of components and signals which require testing, the embodiment depicted in FIG. 4 uses a hybrid model composed of system components 406 and a simulator 408 which interact with each other.

As depicted, system components 406 includes one or more sets 409 of grouped system components categorized based on, for example, the communication protocol used by the components. In some embodiments, system components may include one or both hardware (i.e. physical components 402) and virtual (simulated software) components 403. Each of the physical components 402 and virtual components 403 may be interacting with a listener unit 420 as described below. Listener units 420 may include, for example, audio listeners, object alert listeners, camera listeners, Bluetooth listeners, seat belt listeners, or the like.

In some embodiments, virtual components 403 are implemented as mathematical model representations of real components in the CV/AV 107 under test and have the same characteristics in terms of input and output signals for their corresponding real components. In some embodiments, virtual components 403 are implemented using computer-executable instructions executing on one or more processors 114.

Simulator 408 is a mathematical model (i.e. plant model) of the SUT 404 running in a simulation environment. In some embodiments, simulator 408 is running in a real-time simulation environment. Simulator 408 provides a simulation environment for one or more virtual components 403a, 403b, ... 403m. The use of virtual components may provide certain benefits, in particular, that the same physical component 402 may only be able to be tested one test at a time, whereas multiple virtual components 403 for the same component may be used in different system component sets 409a, 409b, 409m, thus enabling test cases which may involve the use of the same component to be executed on different virtual components in parallel, thereby increasing the efficiency of the testing process rather than waiting until a physical component becomes free to be tested.

In some embodiments, each component set 409 is defined for a set of components utilizing, for example, a specific communication protocol. Each component set 409 may include, for example, one or more physical and/or virtual components.

As depicted in FIG. 10, test case manager 430 is a control unit responsible for the execution of test cases and comparing actual results to expected results, and providing corresponding test verdicts. For each test case from $T_s$, mapping process 428 is configured to match components and states in metamodel 310 with components and states that exist in database files. For example, database files might include DBC files for a CAN bus, and/or LDF files for a LIN bus. Mapping process 428 may act as a translation layer in which original terms (e.g. component names and/or state names) defined in metamodel 310 may be mapped to particular terms which are found in the data within database files when deemed appropriate. In some embodiments, mapping process 428 may support database files from various network architectures and types, such as CAN (controller area network) bus, FlexRay, Ethernet, LIN (local interconnected network) bus, and MOST (media oriented system transport). However, it should be appreciated that the framework described herein may support any new protocols developed in the future and other existing protocols.

In some embodiments, test case manager 430 is configured to retrieve the current state of the components in SUT 404 and to send a control signal to each component to set the pre-conditions for the particular test case to be executed. Then, the test case is executed by applying the action to SUT 404. The final state of the components is then retrieved by the test case manager 430 to determine test verdicts. In some embodiments, test verdicts may be one of passed, failed, and skipped. In other embodiments, test verdicts may have any suitable format to indicate qualitative results of the comparison between actual and expected results.

To communicate with system components 406 during the execution of test cases, listeners 420 are provided as an interface between various components of SUT 404 and test case manager 430. Since there tend to be overwhelming amounts of variation between component manufacturers, communication between systems can be challenging. Listener modules 420 are provided which include a communication channel (communication protocol 422) and a data processing block 424. In some embodiments, a separate listener module 420b may be provided for each set of physical components 402a, and a separate listener module 420a may be provided for each set of virtual components 403a. In some embodiments, there may be 2 listeners 420 provided for each component set 409a, 409b, . . . .

In some embodiments, communication channel 422 is configured to retrieve the state of physical components in SUT 404 and/or send control signals (e.g. corresponding to an action dictated by the test case) which allow for the change of the component's state.

In some embodiments, CV/AVs 107 may include various hardware and vehicle network types and protocols designed by different manufacturers. As such, data packets sent through a vehicle network within CV/AV 107 will follow the formats and structures as dictated by the communication protocols being used.

Listener 420 is configured to cover and/or support various network protocols (using, e.g., network interface 120). Such protocols may include, for example and without limitation, CAN (controller area network) bus, FlexRay, Ethernet, LIN (local interconnected network) bus, and MOST (media oriented system transport). Communication signals may be captured by listener 420 and, depending on the selected network protocol, the corresponding data packet (e.g. a DBL file for CAN bus or LDF file for LIN bus) can be interpreted. In some embodiments, a specific communication protocol may be allocated to each respective listener 420 for each component set 409.

In some embodiments, data processing unit 424 may convert incoming signals from test case manager 430 to the appropriate communication protocol for the intended recipient physical component 402 or virtual component 403. In some embodiments, data processing unit 424 may convert incoming signals from physical component 402 or virtual component 403 to the appropriate communication protocol for the test case manager 430 to be able to receive and interpret results. Although only depicted for component set 409m and listener 420-2m, it should be appreciated that measurements from the component set 409 may be transmitted to listener 420 and in turn to test case manager 430, and that control signals may be transmitted from test case manager 430 to listener 420 and in turn to the component set 409 for any of component sets 409a, 409b, or the like.

Some embodiments of the systems and methods described herein may provide a SIT framework for connected/autonomous vehicles 107 which can robustly handle variations in various component features and manufacturers in the CV/AV 107. MBT allows for test cases to be generated automatically rather than manually, based on a set of rules and operational situations. Test cases may then be prioritized by determining risk scores for test cases, and a machine learning-based approach may then be used to re-prioritize test cases as test cases are being executed. Improved communication between the integration testing system 126 and the SUT 404 may be achieved through the use of listener blocks 420, which support various communication protocols and enable components using different protocols or manufacturing schemes to nevertheless communicate with test case manager 430. Moreover, the use of virtual components in tandem with physical components may allow for more efficient execution of test cases, through both parallel processing gains, particularly when one particular component is associated with the highest risk scores and may require more testing than other individual components.

It should be noted that although this disclosure makes frequent reference to a connected or autonomous vehicle being connected to an integration testing system, it is contemplated that embodiments disclosed herein may be used for performing SIT on other electronic devices and computing systems and is not limited strictly to connected and/or autonomous vehicles.

Of course, the above-described embodiments are intended to be illustrative only and in no way limiting. The described embodiments are susceptible to many modifications of form, arrangement of parts, details, and order of operation. The invention is intended to encompass all such modifications within its scope, as defined by the claims.

What is claimed is:

1. A method of performing system integration on a system of a vehicle, the method comprising:
   generating, by the processor, test cases based on requirements and/or specifications for a system under test;
   prioritizing, by the processor, said test cases based on hazards associated with said test cases;
   executing one or more of said prioritized test cases, wherein said executing comprises
      mapping, at a mapping module, components in said test case to existing database components;
      transmitting control signals including parameters associated with said mapped test case to a listener module configured to transform said control signals to a format that can be received by a component to be tested; and
   obtaining a verdict for each of said one or more prioritized test cases.

2. The method of claim 1, wherein the generating the test cases comprises generating a metamodel based on the requirements and/or specifications for the system under test.

3. The method of claim 2, wherein generating the metamodel comprises: generating a set of operational situations based on the user requirements;
   generating a set of rules based on the functional requirements; and
   generating the metamodel based on the set of rules and the system specifications.

4. The method of claim 2, wherein the metamodel comprises one or more activator sets, said activator sets comprising at least one impacted component having a state which is impacted by a state of at least one other component of said system under test.

5. The method of claim 1, wherein prioritizing said test cases comprises calculating a risk score for each test case, and wherein test cases are prioritized based on test cases having the highest risk scores.

6. The method of claim 1, further comprising after obtaining a verdict for at least one of said executed test cases, calculating a lift metric based on said verdict; and re-prioritizing remaining test cases based on said lift metric.

7. The method of claim 1, wherein obtaining a verdict for said prioritized test case comprises:
receiving, at said listener module, one or more measurement signals from said component to be tested;
transforming said one or more measurement signals to a format that can be received by the test case manager; and
determining the verdict for said prioritized test case by comparing said one or more measurement signals to one or more expected measurement signals from said test case.

8. The method of claim 1, wherein executing said prioritized test cases comprises:
transmitting said test case to a test case execution module connected to said system under test; and
transmitting control signals including parameters associated with said test case to one or more components of said system under test, wherein said one or more components include at least one physical component and at least one virtual component.

9. The method of claim 1, wherein the one or more requirements include at least one of functional requirements and/or user requirements.

10. A system for performing system integration on a system of a vehicle, the system comprising:
a non-transitory computer-readable storage medium having stored thereon computer-executable instructions that, when executed by one or more processors, cause the one or more processors to:
generate test cases based on requirements and/or specifications for a system under test;
prioritize said test cases based on hazards associated with said test cases;
execute one or more of said prioritized test cases, wherein said executing comprises:
mapping, at a mapping module, components in said test case to existing database components;
transmitting control signals including parameters associated with said mapped test case to a listener module configured to transform said control signals to a format that can be received by a component to be tested; and
obtain a verdict for each of said one or more prioritized test cases.

11. The system of claim 10, wherein the one or more requirements include at least one of functional requirements and/or user requirements.

12. The system of claim 11, wherein the metamodel comprises one or more activator sets, said activator sets comprising at least one impacted component having a state which is impacted by a state of at least one other component of said system under test.

13. The system of claim 10, wherein the generating the test cases comprises generating a metamodel based on the requirements and/or specifications for the system under test.

14. The system of claim 13, wherein generating the metamodel comprises:
generating a set of operational situations based on the user requirements;
generating a set of rules based on the functional requirements; and
generating the metamodel based on the set of rules and the system specifications.

15. The system of claim 10, wherein prioritizing said test cases comprises calculating a risk score for each test case, and wherein test cases are prioritized based on test cases having the highest risk scores.

16. The system of claim 10, wherein the computer-executable instructions further cause the one or more processors to: after obtaining a verdict for at least one of said executed test cases, calculating a lift metric based on said verdict; and re-prioritizing remaining test cases based on said lift metric.

17. The system of claim 10, wherein obtaining a verdict for said prioritized test case comprises:
receiving, at said listener module, one or more measurement signals from said component to be tested;
transforming said one or more measurement signals to a format that can be received by the test case manager; and
determining the verdict for said prioritized test case by comparing said one or more measurement signals to one or more expected measurement signals from said test case.

18. The system of claim 10, wherein executing said prioritized test cases comprises:
transmitting said test case to a test case execution module connected to said system under test;
transmitting control signals including parameters associated with said test case to one or more components of said system under test, wherein said one or more components include at least one physical component and at least one virtual component.

* * * * *